United States Patent Office 3,037,913
Patented June 5, 1962

3,037,913
MICROBIOLOGICAL DEHYDROGENATION OF Δ⁴ STEROIDS OF THE PREGNENE SERIES USING BACTERIUM MYCOIDES
Louis I. Feldman, Spring Valley, and Anthony J. Shay, Pearl River, N.Y., and Neil E. Rigler, Ridgewood, N.J., assignors to American Cyanamid Company, New York, N.Y., a corporation of Maine
No Drawing. Filed May 6, 1960, Ser. No. 27,255
7 Claims. (Cl. 195—51)

This invention relates to the dehydrogenation of steroids. It is concerned primarily with a novel method of dehydrogenating steroids such as those of the pregnane series by means of a novel microbiological fermentation. Still more particularly, it deals with such a procedure whereby a double bond is introduced in the 1,2-position.

For the purposes of this discussion, the rings of the steroid structure with which the invention is concerned are designated as A, B, C and D respectively and the several positions are numbered as shown in the following diagram:

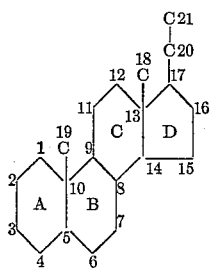

A number of steroids of the pregnadiene series such as 1-dehydrohydrocortisone, for example, are becoming increasingly important either as therapeutic agents or/as intermediates in the preparation of other therapeutically useful steroids. Such compounds, which are obtained by the practice of the present invention, are useful in anti-inflammatory agents in the treatment of arthritis, asthma, burns, bursitis, and the like, and also in the treatment of skin disorders and collagen diseases. As such these compounds are used in combination with fillers, excipients, etc., in tablets, powders, pills, etc. They can also be used parenterally in a solution or in a suspension.

In accordance with the present invention, it has been found that very useful steroids of the 1,4-pregnadiene series can be prepared by the use of *Bacterium mycoides* to accomplish the desired dehydrogenation in ring A of such steroids. One type of reaction obtained in the process of the present invention can be illustrated, for example, in the following equation:

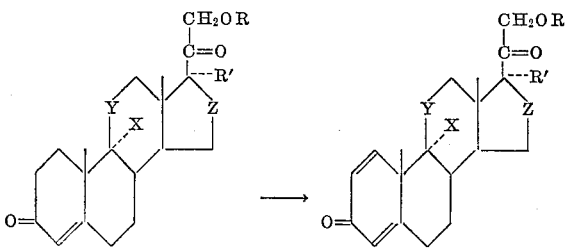

in which X is hydrogen or halogen, Y is methylene, hydroxymethylene, or carbonyl, Z is methylene, hydroxymethylene, or lower alkanoyloxymethylene, R' is hydrogen or hydroxyl and R is hydrogen or lower alkanoyl.

In carrying out the process of the present invention, the organism is cultivated aerobically in a suitable nutrient medium with a Δ⁴-steroid of the pregnene series. During the growth of the organism under favorable conditions, two hydrogen atoms are eliminated from steroid ring A, and a double bond is thereby obtained in the 1,2-position. The exact mechanism of this dehydrogenation is not wholly certain. It is thought to be caused by enzymes produced by the organism in the process of growth.

A suitable nutrient medium contains a soluble source of carbon, nitrogen, and mineral elements. In general, the preparation of such media is well known and the practice of the present invention in this respect may follow such procedures.

Illustrative sources of carbon include sugars, such for example as glucose, sucrose, maltose, dextrose, xylose, galactose, and the like; alcohols, such as glycerol or mannitol; starches such as corn starch and the like; various organic acids, such as citric, malic and acetic acids; various natural products containing carbohydrates, such as corn steep liquor, soybean meal, cottonseed meal, and many other available materials which have been used heretofore as a source of carbon in fermentation processes. Usually a variety of the above can be employed in the medium with good results.

As suitable sources of nitrogen, may be included in some of the above-named materials, such as corn steep liquor, soybean meal, cottonseed meal and the like. Various other substances may be utilized, as for example, beef extract, casein, yeast, enzymatically digested proteins, and degradation products, including peptones, amino acids, and many other available proteinaceous materials which have been found to be suitable in supporting the growth of bacteria. Inorganic sources of nitrogen, including urea, ammonium salts, nitrates, and the like, also may be used in the medium as a source of assimilable nitrogen to provide a favorable growth medium for the organism.

Mineral requirements of fermentation are usually supplied in the crude materials which are often used as sources of carbon and nitrogen or occur in the water available for use in the process. However, it is usually advisable to supplement the minerals normally present with added amounts to obtain an optimal growth. Cations and anions which may be desirable in added amounts include sodium, potassium, calcium, magnesium, phosphate, sulphate, chloride, cobalt, manganese, and various others. It is often desirable, also to provide such trace elements as boron, copper, cobalt, moylbdenum, chromium and the like.

Growth of the organism takes place under aerobic conditions and suitable aeration, in flasks, for example, can be achieved by agitation on a reciprocating or rotary shaker or in bottles or tanks by forcing sterile air through the fermentation mixture. In good practice, sterile air should be available in the medium in a ratio to the medium in the range of from about 1:3 to about 2:1 volumes per minute. Agitation in bottles or fermenter tanks is provided by a mechanical impeller. While the organism will grow at temperatures of 5° and 45° C., it is preferable for optimum results to carry out the process of the present invention within a somewhat more limited temperature range of from about 25° to about 37° C.

To prepare inocula, 1.0 ml. of washed vegetative cell suspension of the bacterium is used to inoculate 100 ml. of sterile medium in a 500 ml. Erlenmeyer flask. An illustrative medium of this type contains the following: 1% cerelose, 0.1% yeast-extract (Difco), 0.4% of peptone (Bacto), sodium chloride 0.25% and beef extract (Armour) 0.4%. This mixture is adjusted to about pH 7 and sterilized for 15 minutes at a temperature of 120° C. (15 pounds steam pressure). This medium is used in the illustrative examples below. The inoculated flask is incubated at 37° C. on a shaker for about 4 to 8 hours. Such inocula may be used to inoculate larger batches of sterile medium in bottles, and such bottle cultures, after fermentation, may be used to inoculate large batches of medium in fermenter tanks. This procedure is given as a typical illustration only, and may be varied if necessary or desirable. For example instead of the Medium No. 13 described above, other known media may be used.

Typical $\Delta^4$-steroids of the pregnene series which can be usefully processed according to the present invention include for example 4-pregnene-11β,17α,21-triol-3,20-dione (hydrocortisone), 4-pregnene-11β,21-diol-3,20-dione (corticosterone), 4-pregnene-17α,21-diol-3,20-dione (Reichstein's Substance S), 4-pregnene-11α,17α,21-triol-3,20-dione (11-epi-hydrocortisone), 4-pregnene-11β,16α,17α,21-tetrol-3,20-dione, 9α-fluoro-4-pregnene-11β,16α,17α,21-tetrol-3,20-dione, 4-pregnene-16α,17α,21-triol-3,11,20-trione, 4-pregnene 17α,21-diol-3,11,20-trione; esters thereof, such as the acetate, and the like.

The amount of steroid added as substrate to the fermentation may be varied as necessary or desirable. However, a good practice will ordinarily be found on the order of about 0.05 to 1.0 gram per liter of nutrient medium.

When using such steroid substrates in the fermentation, the products formed are the free steroids. These steroids are generally added to the fermentation in a solution or in finely-divided form. A preferred method is to dissolve the steroid in ethanol or other water-miscible solvents and add it to the fermentation medium at the desired stage in the process. Although the steroid may precipitate from solution when so added, it is dispersed throughout the medium as a fine suspension and becomes readily available to the organism for oxidation.

During fermentation process, it may be found desirable to add an antifoaming agent. In such cases, commercially-available products may be used. These usually contain such agents as silicones, glyceride oils, and the like. These compounds are added from time to time and in the amounts needed.

In general, practice of the process of the present invention may be illustrated by the following procedure. About 10 ml. batches of inoculated medium are placed in 100 ml. shaker tubes and incubated, usually for a period of about 16 to 40 hours, at an average temperature of about 28° C. At this point, 2 mgm. of sterile substrate (4-pregnene steroid) dissolved in 0.2 ml. of ethanol is added to each tube. Fermentation is then continued, at about 28° C. for sufficient time to obtain maximum conversion of the 4-pregnene to the 1,4-pregnadiene. This period of time may vary from as little as about one hour to about 72 hours, or longer.

At the conclusion of fermentation, the product $\Delta^{1,4}$-steroid of the pregnadiene series is recovered from the fermentation medium. This may be illustrated by the following procedure, which describes in particular a ten ml. fermentation. However, this is a general procedure, operative for fermentations of various sizes.

The contents of a fermentation tube are extracted with three volumes of a suitable solvent such as ethyl acetate. The solvent phase is evaporated to dryness and the residue is then dissolved in a suitable solvent such as methanol, dimethylformamide or mixtures thereof. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steroid products from extracts may be accomplished by methods well understood by those skilled in the art. Separation and purification of a steroid mixture often requires the use of chromatography.

The process employed to identify the steroids present in the extracted fermentation beer previously described is by paper strip chromatography. A solvent system used is petroleum ether:benzene:acetic acid:p-dioxane prepared by shaking the solvents listed in the proportion 2:4:1:1 respectively in a separatory funnel and then allowing the two layers to separate. A portion of the lower layer is placed in an open dish on the floor of a large glass cylinder. The upper layer is the solvent phase and is used to fill the trough-shaped well within the cylinder. For comparison, a standard steroid solution is prepared by dissolving a known sample of steroid in dimethyl formamide. At least one standard steroid solution is chromatographed simultaneously each time an unknown solution is tested.

Exactly 0.010 ml. of the standard steroid test solution is applied to the paper strip at the starting line, four inches from the upper end of the strip, which is folded over the edge of the trough and immersed in the solvent phase within. The strip is then developed for 2 to 4 hours.

On another strip, 0.01 ml. of the unknown solution is similarly applied and this strip is then folded into the same trough, being developed simultaneously with the steroid standard strip. This use of the trough permits the simultaneous development of many strips. After proper development of the paper strips, they are removed from the apparatus and air dried. After drying, the strips are placed between a source of ultra-violet light and a zinc silicate coated plate. Steroids containing the $\Delta^4$-3 ketone conjugated system are observed as dark spots. In addition, the strips may be sprayed with an alkaline solution of Blue Tetrazolium, which develops color at the spots where the steroids containing an α-ketol grouping are present. Strips are lined up with at least one "standard" strip and the Rf determined. The different steroids can then be identified by their positions on the strips.

The desired $\Delta^{1,4}$-steroids will be more polar than their corresponding $\Delta^4$-steroid. It should be understood, moreover, that the desired $\Delta^{1,4}$-steroids, once they have been isolated and characterized, may themselves be used in a standard steroid solution for process improvement.

The present invention will be more fully described in conjunction with the following examples. They are intended as illustrations.

EXAMPLE 1

*Preparation of 9α-Fluoro-1,4-Pregnadiene-11β,16α, 17α,21-Tetrol-3,20-Dione*

A test tube agar slant of *Bacterium mycoides* (ATCC No. 4004) is rinsed with 7 ml. of sterile 0.9% saline solution, and the resulting suspension is used to inoculate 100 ml. of sterile medium in a 500 ml. flask and the mixture is incubated on a reciprocating shaker (120 strokes/min.) at 37° C. for about 4 hours. Two ml. portions of this culture are used to inoculate 100 ml. lots of sterile medium in 500 ml. flasks. These inoculated flasks are incubated at 28° C. for 16 hours (with shaking) after which 20 mg. of 9α-fluoro-4-pregnene-11β,16α,17α,21-tetrol-3,20-dione dissolved in 2.0 ml. of methanol is added to each flask and incubation is continued for 144 hours. Five ml. samples are taken at 2, 6, 24, 96 and 144 hours, the contents of each five ml. aliquot being extracted once by shaking for 10 minutes with 15 ml. of ethyl acetate and one-half the extract is concentrated to a dry residue. By means of paper chromatographic analysis, the evaporated material is found to contain principally 9α-fluoro-1,4-pregnadiene-11β,16α,17α,21-tetrol-3,20-dione, showing that the $\Delta^{1,4}$-steroid is formed from the $\Delta^4$-steroid in sizable quantities during the fermentation.

EXAMPLE 2

*Preparation of 9α-Fluoro-1,4-Pregnadiene-11β,16α, 17α,21-Tetrol-3,20-Dione*

A test tube agar slant of *Bacterium mycoides* (ATCC No. 4004) is washed with 4 ml. of 0.9% NaCl and the entire suspension inoculated into a 500 ml. flask containing 100 ml. of sterile medium. After seven hours shaking at 37° C., 1 ml. of the resulting growth is used to inoculate each of five 100 ml. samples of sterile medium in 500 ml. flasks, which are then incubated at 28° C. with shaking. After 16 hours, 20 mg. of 9α-fluoro-4-pregnene-11β,16α,17α,21-tetrol-3,20-dione dissolved in 2 ml. of methanol is added to each flask. Fermentation is followed by paper chromatographic assays. Twenty-eight hours after the steroid addition, the flasks are harvested, pooled, and treated to isolate the 9α-fluoro-1,4-pregnadiene-11β,16α,17α,21-tetrol-3,20-dione.

EXAMPLE 3

Isolation

Product fermentation mash produced as in Example 2 is extracted three times with an equal volume of ethyl acetate. The resultant ethyl acetate extracts are pooled and concentrated under vacuum to obtain a solid residue which is collected and dissolved in equal parts of the lower phase and the upper phase of an equilibrated mixture of a solvent system comprising

| Component: | Parts by volume |
|---|---|
| Water | One |
| Dioxane | Five |
| Cyclohexane | Two |

One half of the solution is chromatographed using conventional partition column chromatographic methods. The major peak of ultraviolet absorbency at 240 mμ is eluted from the column at about 2.5 hold-back volumes. This effluent is collected and assayed by ultraviolet absorption using a known sample of triamcinolone as a standard. The assay indicates that 85% of the substrate was converted to 9α-fluoro-1,4-pregnadiene-11β,16α,17α,21-tetrol-3,20-dione.

A hold-back volume (HBV) of 2.5–3.0 is to be expected for triamcinolone with this system under these conditions. The effluent of the peak is concentrated under reduced pressure to a crystalline residue which is washed with ethyl ether, dried and its infrared absorption curve compared with that of standard samples of triamcinolone. The curves are the same.

In the following examples the product is identified by the procedure shown above in Example 3.

EXAMPLE 4

Using otherwise identical conditions, Example 1 is repeated, but the harvest time is seven hours, and the substrate is hydrocortisone. The product 1,4-pregnadiene-11β,17α,21-triol-3,20-dione is obtained in good yield.

EXAMPLE 5

Example 1 is repeated with the exception that the substrate 9α-fluorohydrocortisone is used. The product Δ¹-9α-fluorohydrocortisone, is obtained in good yield.

EXAMPLE 6

Example 5 is repeated using 9α-fluorohydrocortisone-21-acetate as the substrate. The products as the Δ¹-21 acetate and as the Δ¹ free alcohol are obtained in good yield. In tests of progressively longer harvest time, the proportion of free alcohol to acetate increases.

EXAMPLE 7

Using a harvest time of 24 hours and 16α-hydroxyhydrocortisone as the substrate, Example 1 is repeated. The product Δ¹-16α-hydroxyhydrocortisone is obtained.

EXAMPLE 8

Using the same procedure except that the harvest time is 2 hours and Reichstein's Substance S is used as the substrate, Example 1 is repeated. The product as the Δ¹ analogue is obtained.

EXAMPLE 9

Example 1 is repeated except that 16α-hydroxy-Reichstein's Substance S is used as substrate. After 24 hours, the product is harvested as the Δ¹ analogue.

EXAMPLE 10

Under the same conditions as in Example 1 except that 16α-hydroxy-desoxycorticosterone is used as substrate and harvesting the product after two hours, the Δ¹ analogue is obtained.

EXAMPLE 11

Repeating Example 10 using 11α-hydroxy-progesterone as substrate, the Δ¹ analogue is obtained.

EXAMPLE 12

The same conditions as in Example 10 are used except 11α-hydroxy-16α,17α-epoxyprogesterone is used as substrate. The Δ¹ analogue is obtained.

EXAMPLE 13

The procedure of Example 11 is repeated using as substrate 4-pregnene-3,20-dione. The product is 1,4-pregnadiene-3,20-dione.

In the foregoing examples it will be noted that each has dealt with the introduction of a double bond into the 1,2-position of a Δ⁴-3-keto steroid. In other words, in the general type reactions in which the A ring undergoes a specific change. This change also can be illustrated for example in the following way:

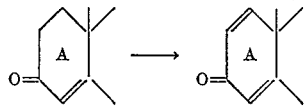

It is this change which characterizes the present invention.

We claim:
1. A process of introducing a 1,2-double bond into a steroid of the pregnane series which comprises subjecting said steroid to the fermentative action of *Bacterium mycoides*.

2. A process according to claim 1 in which the steroid is selected from the group consisting of said steroids wherein the A ring has the formula

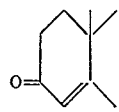

3. A process of preparing a 1,4-pregnadiene wherein the A ring has the structure

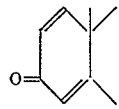

which comprises: in an aqueous medium, under submerged fermentative conditions, subjecting a steroid of the pregnane series wherein the A ring has the formula

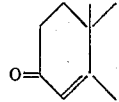

to the dehydrogenating activity of *Bacterium mycoides*.

4. A process of introducing a 1,2-double bond into a steroid of the pregnane series which comprises: inoculating a nutrient medium containing assimilable carbon, nitrogen and mineral salts with *Bacterium mycoides*; adding thereto said steroid of the pregnane series, continuing the resultant fermentative action on the steroid until a substantial amount of corresponding Δ¹,⁴-3-keto-steroid of the pregnadiene series has been produced, and recovering said product therefrom.

5. A process according to claim 4 using *Bacterium mycoides*, ATCC No. 4004.

6. A process according to claim 4 in which the substrate steriod is 4-pregnene-11β,17α,21-triol-3,21-dione, and the recovered product is 1,4-pregnadiene-11β,17α,21-triol-3,20-dione.

7. A process according to claim 4 in which the substrate steroid is 9α-fluoro-4-pregnene-11β,17α,21-triol-3,20-dione, and the recovered product is 9α-fluoro-1,4-pregnadiene-11β,17α,21-triol-3,20-dione.

References Cited in the file of this patent

UNITED STATES PATENTS 2,844,513     Wettstein et al.  ---------- July 22, 1958

OTHER REFERENCES

Prescott et al.: Industrial Microbiology, McGraw-Hill Book Co., Inc. 1959, pp. 725, 726 and 749.

Bergey's Manual, 6th edition, Williams and Wilkins Co., 1948, p. 602.

Bergey's Manual, 7th edition, Williams and Wilkins Co., 1957, p. 1018.